(12) United States Patent
Sines

(10) Patent No.: US 7,328,850 B2
(45) Date of Patent: Feb. 12, 2008

(54) FINANCIAL AND SIMILAR IDENTIFICATION CARDS AND METHODS RELATING THERETO

(75) Inventor: Randy D. Sines, Worley, ID (US)

(73) Assignee: CodeCard, Inc., Worley, ID (US)

( * ) Notice: Subject to any disclaimer, the term of this patent is extended or adjusted under 35 U.S.C. 154(b) by 0 days.

(21) Appl. No.: 11/102,535

(22) Filed: Apr. 7, 2005

(65) Prior Publication Data

US 2006/0032908 A1    Feb. 16, 2006

Related U.S. Application Data

(63) Continuation-in-part of application No. 10/918,683, filed on Aug. 12, 2004, now Pat. No. 7,185,806.

(51) Int. Cl.
*G06K 19/06*    (2006.01)
*G06K 19/00*    (2006.01)

(52) U.S. Cl. ........................... 235/492; 235/487

(58) Field of Classification Search ............... 235/380, 235/451, 492, 487
See application file for complete search history.

(56) References Cited

U.S. PATENT DOCUMENTS

| 4,720,860 | A |   | 1/1988  | Weiss ........................ 380/23 |
| 5,168,520 | A |   | 12/1992 | Weiss ........................ 380/23 |
| 5,237,614 | A |   | 8/1993  | Weiss ........................ 380/23 |
| 5,361,062 | A |   | 11/1994 | Weiss et al. ........... 340/825.33 |
| 5,478,994 | A |   | 12/1995 | Rahman et al. ............. 235/380 |
| 5,479,512 | A |   | 12/1995 | Weiss ........................ 380/28 |
| 5,485,519 | A |   | 1/1996  | Weiss ........................ 380/23 |
| 5,623,552 | A | * | 4/1997  | Lane ......................... 382/124 |
| 5,657,388 | A |   | 8/1997  | Weiss ........................ 380/23 |
| 5,955,961 | A | * | 9/1999  | Wallerstein ................ 340/5.4 |
| 6,095,416 | A |   | 8/2000  | Grant et al. ................ 235/449 |
| 6,188,309 | B1|   | 2/2001  | Levine ..................... 340/5.66 |
| 6,257,486 | B1| * | 7/2001  | Teicher et al. ............. 235/380 |
| 6,398,115 | B2| * | 6/2002  | Krause ...................... 235/492 |
| 6,505,772 | B1|   | 1/2003  | Mollett et al. ............. 235/379 |
| 6,547,130 | B1| * | 4/2003  | Shen ......................... 235/380 |
| 6,595,787 | B2|   | 7/2003  | Fork et al. .................. 439/81 |
| 2003/0052168 | A1 |   | 3/2003 | Wong ....................... 235/451 |
| 2003/0057278 | A1 |   | 3/2003 | Wong ....................... 235/451 |
| 2005/0211785 | A1 | * | 9/2005 | Ferber et al. ............... 235/492 |

\* cited by examiner

*Primary Examiner*—Seung Ho Lee
*Assistant Examiner*—April Taylor
(74) *Attorney, Agent, or Firm*—Gregory IPL

(57) ABSTRACT

Apparatuses forming portable identification cards and associated methods are described. A preferred apparatus includes an input device adapted for a consumer to enter authentication data, a memory for storing reference data, a processor configured to compare the authentication data entered by the consumer to the reference data stored in the memory to determine whether the authentication data entered by the consumer is valid authentication data, an indicator for informing a merchant when the processor has determined that the consumer has entered valid authentication data, and a power source adapted to supply power to the processor and the indicator. Other features are also disclosed.

14 Claims, 7 Drawing Sheets

FINANCIAL AND SIMILAR IDENTIFICATION CARDS AND METHODS RELATING THERETO

RELATED CASE INFORMATION

This is a continuation-in-part of U.S. patent application Ser. No. 10/918,683 filed on Aug. 12, 2004, now U.S. Pat. No. 7,185,806 which is expressly and totally incorporated by reference hereinto. Priority is claimed under 35 USC §120.

TECHNICAL FIELD

The invention relates to an apparatus forming a portable identification card, such as a credit, debit or other financial card and to methods associated with such cards.

BACKGROUND OF THE INVENTION

In the United States, in particular, and in other countries, many financial and other identification cards are relatively simple magnetic stripe cards. In the past these cards have typically had the account number information, account name, expiration date and in some cases a "security code" included in legible form embossed or printed onto the exterior of the cards. Anyone can read this information and it may in many instances be misused if in the wrong hands.

The above forms of identification cards have also been found susceptible to theft and use in making fraudulent transactions. In many instances such cards are stolen and then an unauthorized user employs the card in making charges against the associated account. This is easily done at automated card reading stations at fuel stations, by phone, and at other merchants. This type of fraud may be referred to as "stolen card fraud". Such fraudulent use may continue until such time as the card is reported stolen and the account associated therewith is inactivated throughout the card data processing system.

In addition to stolen card fraud there is also a sizeable amount of fraud that occurs by duplicitous, but rightful, account holders or users. In this type of fraud, sometimes called "account holder fraud" or "card holder fraud", the card holder will purchase one or more items using the charge or debit card and then report the card as having been stolen.

The procedures for dealing with fraudulent transactions, and the difficulties associated with investigations, are such that much stolen card and card holder fraud goes by undetected without costly investigation, and without prosecution by government officials. Such investigation and prosecution are often not of high enough priority for these officials to take action. Some financial card issuers believe card holder fraud represents the largest segment of fraud involving these types of cards.

In an effort to prevent fraudulent transactions, many merchants will now ask for identification when a charge or debit card is presented as a form of payment. The merchant will typically ask to see the consumer's drivers license or some other suitable form of identification. The information provided on the consumer's drivers license is then used by the merchant in an effort to verify that the consumer presenting the card is in fact authorized to make purchases with the card. This verification process typically involves two steps. First, the merchant compares the signature on the card to the signature on the consumer's drivers license. After comparing the signatures, the merchant generally examines the drivers license photograph in an attempt to match the photograph to the consumer who presented the card.

Unfortunately, this process of requesting identification, and then comparing signatures and matching photographs to card users often proves unsatisfactory. For a variety of reasons, merchants and/or merchant representatives often fail to obtain proper identification from consumers who present charge and/or debit cards as a method of payment. Moreover, even when the merchant does ask for and receive proper identification (e.g., a drivers license) from the consumer, the process of verifying the signature and matching the photograph can be very difficult.

Merchants are not typically skilled at comparing customer signatures which can be highly variable. In addition, making such a comparison can be especially difficult in a busy retail environment, where the merchant may have a long line of customers waiting, and little time for studying and comparing the signatures.

In addition, the process of matching a drivers license photograph to a customer's face can prove to be a difficult task. The ability to make such comparisons varies from person to person, and many merchants and their staff have little skill in this area. Moreover, even for those who possess some skill for making such comparisons, many factors can complicate the task. For example, the drivers license and associated photograph can be several years old and therefore provide a poor representation of the consumers current appearance. Even in cases where a recent photograph has been presented, changes in weight, hair color, eye color (e.g., colored contact lenses), and/or cosmetic surgery can rapidly change a person's appearance, making it difficult to adequately match the photograph to the consumer. Because of such difficulties, other methods and apparatus for decreasing fraudulent transactions are needed.

Some problems associated with stolen card fraud and cardholder fraud have in part been addressed in some credit, debit and other types of identification cards, by requiring entry of a personal identification number (PIN) at the place of use on a key pad entry device which is typically located adjacent to a magnetic card reader. Such key pad entry devices are typically part of the card handling system and are often mounted on the "check-out" counter in retail establishments such as grocery stores. Such systems are commonly used by swiping or otherwise passing the magnetic stripe cards though a reading slot in the card reader. The user then uses the associated key pad to input the PIN. Such systems are also frequently used at automated bank tellers and at many retail merchant locations.

Although this approach has helped to reduce the problems of cardholder fraud and stolen card fraud it does not address the various situations where such key pad entry devices are not available. For example, such key pad entry devices are not available when a card is used to make purchases over the telephone and/or over the computer (e.g., "on-line" or over the internet). Presently, when making such purchases, a consumer may be asked to provide a security code, which is typically included in legible form, embossed or printed onto the exterior of the card. Unfortunately, the provision of such a security code does little to ensure that the consumer making the purchase is authorized to use the card, since the security code is readily visible to anyone in possession of the card.

Another problem associated with key pad entry stands adjacent to magnetic card readers is that such stands are generally in view of other people. Therefore, entry of the PIN may be observed by others standing in line. Additionally, more sophisticated techniques, such as using audio waves, radio waves, or imaging, may be used to capture this sensitive information. Such sophisticated techniques may be completely undetectable by the store personnel or customers being subjected to fraud or collection of information that can be used to commit fraud.

There has been resistance to adopting and using card readers with key pad entry stands with visible PIN inputs by many individuals due to the above and other security problems.

Additionally, the bulk of magnetic stripe card readers are not set up with an associated key pad entry stands and the majority of electronically processed transactions continue to be processed without use of any PIN entry by the card user due to the established procedures for processing such transactions. This makes fraudulent use of magnetic stripe financial identification cards easier with regard to both stolen cards and fraud practiced by cardholders as explained above.

In an effort to stem the costs of card fraud, there has been a substantial amount of development of financial cards that are called "smart cards". Such smart cards typically employ an electronically programmable integrated circuit or circuits that have permanent memory. The smart cards are programmed for a particular user and account, and are difficult to alter for use in fraudulent transactions by others. This technology has been more widely adopted in European and some other foreign countries than it has within the United States. Since the United States has many magnetic stripe card readers, the newer technology smart cards have not solved the problems associated with striped cards and magnetic stripe readers.

A prominent disadvantage of smart cards is that they require a smart card reader that is specifically adapted to read the particular type of smart card being employed. The smart card technology that has been developed varies. There are a number of different types of smart cards with complementary smart card readers. The readers are not the same, and a correct type of reader is needed to read a particular type of smart card design. Since there are many smart cards with associated proprietary readers, this has deterred their acceptance in the United States and elsewhere. At this time there is no single standard for smart cards.

For these and possibly other or future reasons, the smart card technologies available have not been widely accepted for use as financial cards in the United States and many other countries that continue to use magnetic stripe reader technology. Accordingly, there are a very large number of merchants that continue to use magnetic stripe readers in making charge and debit account transactions. This continued use of magnetic stripe readers expected for many years despite the very large volume of fraudulent transactions being made. These fraudulent transactions not only cause costs to be incurred by merchants, they also cause costs to be incurred by the financial industry and insurance companies that insure merchants, banks and other industries against fraud losses associated with charge cards.

In view of these and other considerations, there remains a need for an improved portable identification card (e.g., a credit and/or debit card) and associated methods which will simplify the process of verifying whether a customer is authorized to use the card, provide greater convenience and security, and decrease risks of fraudulent card use.

BRIEF DESCRIPTION OF THE DRAWINGS

Preferred embodiments of the invention are described below with reference to the following accompanying drawings. It should be noted that some drawings are not to scale in order to best show the described features.

DETAILED DESCRIPTION OF THE PREFERRED EMBODIMENTS

Introductory Note

Figure 1:
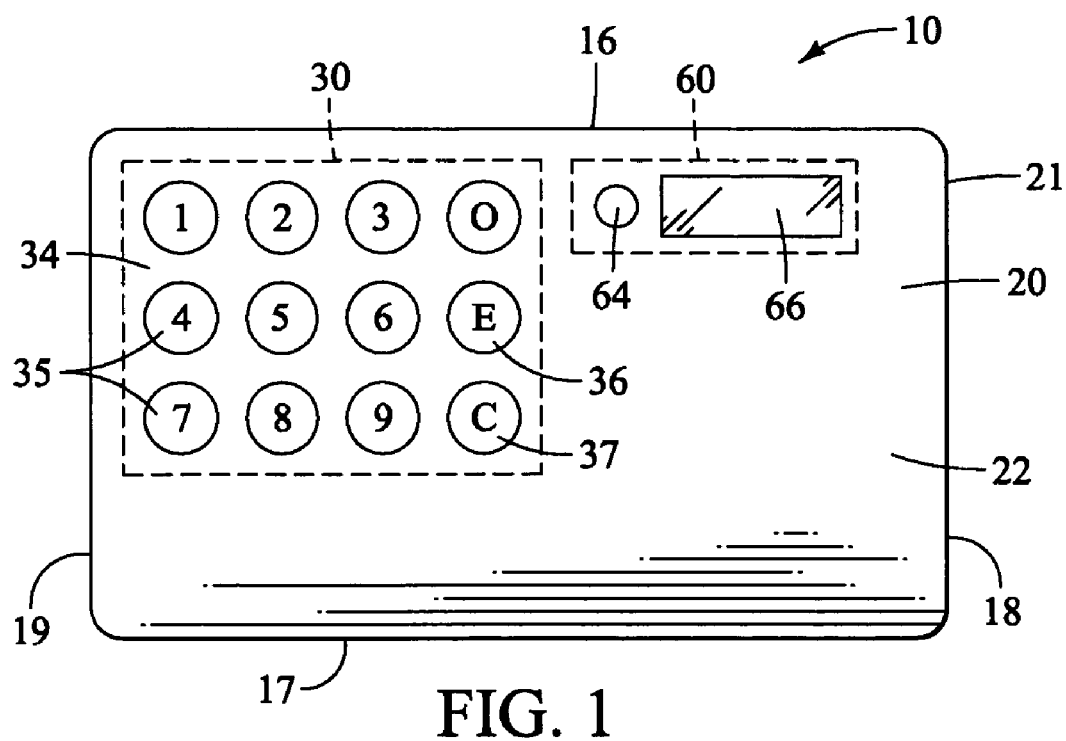
FIG. 1 is a front view of an exemplary card in accordance with one embodiment of the present invention.

The readers of this document should understand that the embodiments described herein may rely on terminology used in any section of this document and other terms readily apparent from the drawings and language which is commonly used therefor. This document is premised upon using one or more terms with one embodiment that may also apply to other embodiments for similar structures, functions, features and aspects of the invention. Wording used in the claims is also descriptive of the invention and the text of the claims is incorporated by reference into the description entirely in the form of the claims as originally filed. Terminology used with or applicable to one, some or all embodiments may be used for describing and defining the technology and exclusive rights associated herewith.

The Card in General

Embodiments according to the present invention are now described in detail with reference to FIGS. 1-9. When referring to the drawings, like numerals are used to indicate the same or similar elements if multiple embodiments are shown.

Referring first to FIGS. 1-6, an apparatus forming a portable charge, debit or similar identification card is generally indicated by the numeral 10. A preferred card 10 contemplated by the present invention can be any suitable size or shape. However, card 10 is preferably of a rectangular shape, and of a size similar to, or the same as, that commonly used for conventional financial cards (e.g., credit cards and debit cards).

The rectangular shape of the card 10 is defined in part by a top edge 16 (first or long side edge), a bottom edge 17 (second or long side edge), a right edge 18 (first or short end edge) and a left edge 19 (second or short end edge). The card 10 has a front surface 20 and a back surface 21. The edge corners may be rounded such as the quarter-circular shape shown. Together, the edges 16, 17, 18 and 19 and the front and back surfaces 20 and 21 define in part a card body 22.

One may appreciate that by shaping and sizing the card body 22 and/or card 10 so that it is the same as, or similar to, conventional financial cards, the card 10 is more likely to be readily recognized and accepted by existing or standardized card readers and their users, merchant owners, and others.

The card 10 may include written, embossed, or other information on the front or back surfaces 20, 21 of the card 10, if desired (not shown). However, the inclusion of such information is not required. Such information can include data which is commonly included on conventional financial cards. By way of example, this information may include such things as: the account number, the card holder's name, the date the card holder became a member (i.e., member since data), the expiration date, logos, photographs, a security code, and/or signatures. Any other information may be included or deleted from the outer surface of the card as desired or required. For example, in some implementations, the card 10 of the present invention does not include a security code in written or embossed form on the front or back surfaces 20, 21 of the card 10

The Magnetic Stripe

Figure 2:
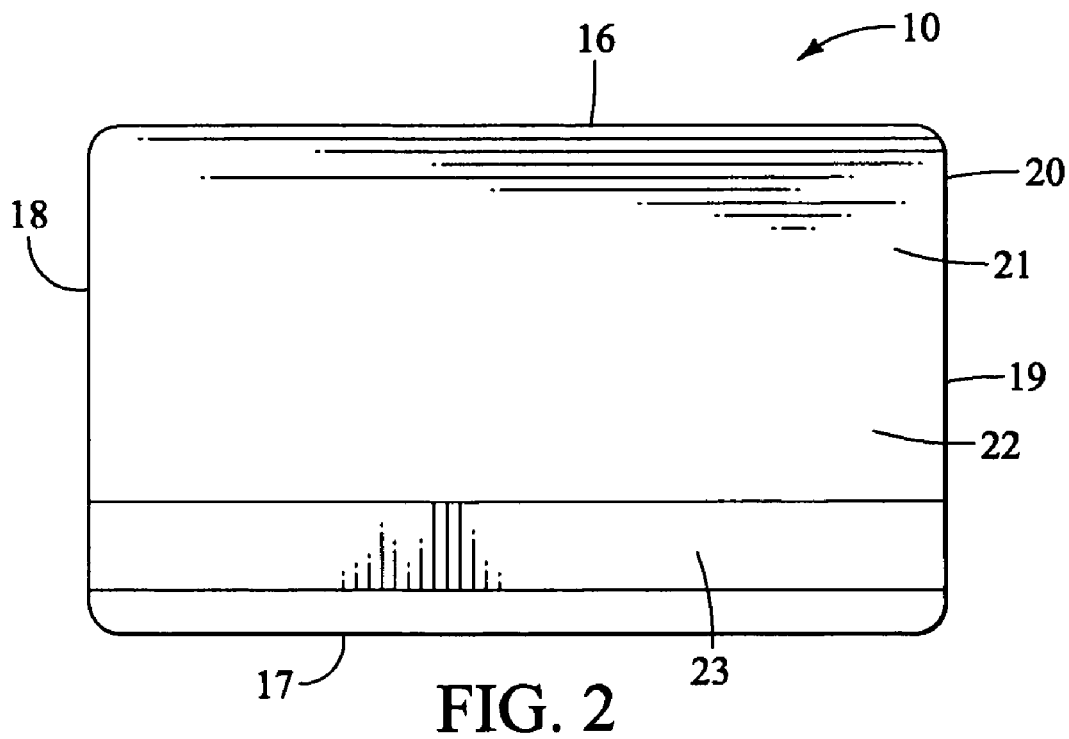
FIG. 2 is a back view of an exemplary card in accordance with one embodiment of the present invention.
Figure 6:
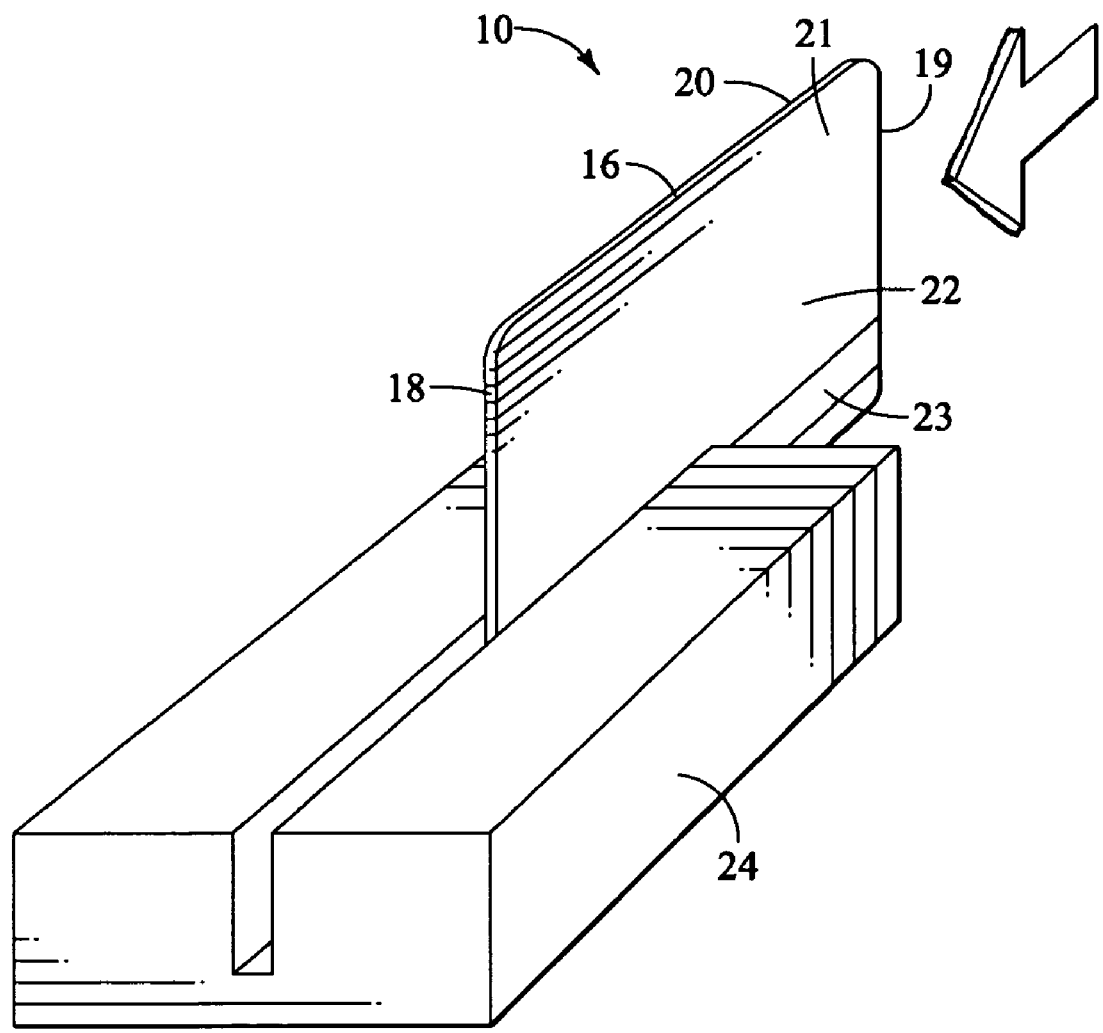
FIG. 6 is a diagrammatic perspective view showing the card of FIG. 2 as it is swiped through a card reader or a relevant portion of a card reader system.

Referring now to FIGS. 2 and 6, in one embodiment the card 10 can include a magnetic stripe or strip 23 for storing encoded information. The card 10 which includes such a magnetic stripe 23 can advantageously be swiped through and read by a variety of conventional magnetic swipe card readers and/or relevant portion of a card reader system 24. FIG. 6 shows card 10 being swiped through such a magnetic card reader system 24. Movement of the card 10 through the card reader 24 is indicated by an arrow in FIG. 6.

Information or data can be stored on the card 10. For example, information or data can be encoded on the magnetic stripe 23 in accordance with any suitable data format. The current conventional magnetic stripe has an industry standard allocation of bits for various types of data and different multiple tracks. Therefore, although such information can be stored at any suitable location (e.g., track) on the magnetic stripe 23, industry conventions or standards will typically apply.

In one preferred embodiment the information is encoded in accordance with international standards so typical magnetic swipe readers 24 will readily read the card 10 (as represented diagrammatically in FIG. 6). However, alternative configurations may also be equally acceptable. The magnetic stripe 23 can be used for identification and/or for other purposes, such as amount of cash available or other information.

In addition to the storage of information on a magnetic stripe 23, the present invention also contemplates the use of any other now-know or yet-to-be discovered forms of card data storage which can be used in place of and/or in addition to the magnetic stripe 23. By way of example and not by way of limitation, embodiments of the card 10 can also include a smart chip for data storage.

Because magnetic stripes for storing encoded information and magnetic card readers (e.g., magnetic swipe card readers) configured to read the encoded information are well known, this document will not review the fundamental technology related to magnetic stripes and their applicable card readers. Instead, this document will describe new apparatuses and methods for utilization of this technology.

Referring once again to FIGS. 2 and 6, the magnetic stripe 23 can be located on the back surface 21 of the card 10 along the lower edge 17. As best shown in FIG. 2, the magnetic stripe 23 may extend substantially between the right and left edges 18, 19 over the back surface 21 of the card However,
locating the magnetic stripe 23 on the back surface 21 in alternative locations is potentially acceptable. In addition, the stripe 23 can alternatively be located in any other suitable position on, in or otherwise included as part of card 10. However, the magnetic stripe 23 is preferably positioned so that the magnetic stripe 23 will be in proper alignment to be read when the card 10 is swiped through a conventional or specialized card reader 24 being used (as represented diagrammatically in FIG. 6).

Information Storage

The present invention contemplates the use of any other now-know or yet-to-be discovered suitable forms of card data storage which can be used in place of and/or in addition to the magnetic stripe 23. Some of these implementations of card 10 do not include a magnetic stripe 23 for storing encoded information. By way of example and not by way of limitation, embodiments of the card 10 can include a programmable integrated circuit or circuits for storing information.

The Card User Detector or Input Device

FIGS. 1 and 3-5 show some preferred cards 10 according to various aspects of the inventions. The cards 10 include at least one detector for sensing actions, attributes or other characteristics of a user. The detection may be accomplished using an input device 30 requiring manipulation, or it can be a device 30 that serves passively (thumbprint), or actively by interrogation of the user's body to determine biological information. The input, such as a PIN, thumbprint, retinal scan, etc. can be combined with one or more other authentication fields to indicate authenticity or non-authenticity of the user. Biological information or other authentication data may be used in combination with user active input data, such as a PIN.

The input device or devices are generally illustrated as a box 30 shown in phantom lines. The input device or other detector 30 can be adapted for a user to enter verification or authentication data, and can be of various suitable designs. In addition, the input device 30 can be located at various suitable positions on the card 10 or can be attached thereto in a suitably durable fashion to allow input of the user input data. The user input or other detection system 30 can be cooperatively operated with one or more indicators and/or displays as described below.

The Key Input Embodiment

Referring to FIG. 1, in one implementation detector 30 comprises at least one key, such as a keypad 34 located on the front surface 20 of card 10. Keypad 34 is adapted to receive or detect user input, such as the authentication data entered by the user. Here the keypad 34 includes a plurality of numerical keys 35 which can be sequentially pressed to enter data, such as authentication data, for example, a personal identification number (PIN), or other means for verifying or authenticating the user. The required input may be dynamic and variable from use-to-use or static and similar for each use.

Keypad 34 may also include one or a multiple of function keys, such as an enter key 36 and clear key 37. The enter key 36 is to be pressed by the user once the PIN has been successfully entered. Pressing the enter key 36 will cause the PIN to be sent to the processor (as described below).

Keypad 34 can also include a correct or clear key 37. The correct key 37 can be pressed by the user to backspace or clear an incorrectly entered number or PIN, so that the user can clear the erroneous entry and try again to enter the correct number or PIN. In one version of the inventions, the correct key 37 will allow the user to delete an incorrectly entered PIN as long as the enter key 36 has not already been pressed by the user.

In one implementation, the keypad 34 comprises a "capacitance film" whose individual keys 35 are activated when touched by the user's finger. Other suitable electrical, electromechanical or other types of input keys may also be used whether currently available or hereafter developed.

A Biometric Input Embodiment

Figure 3:
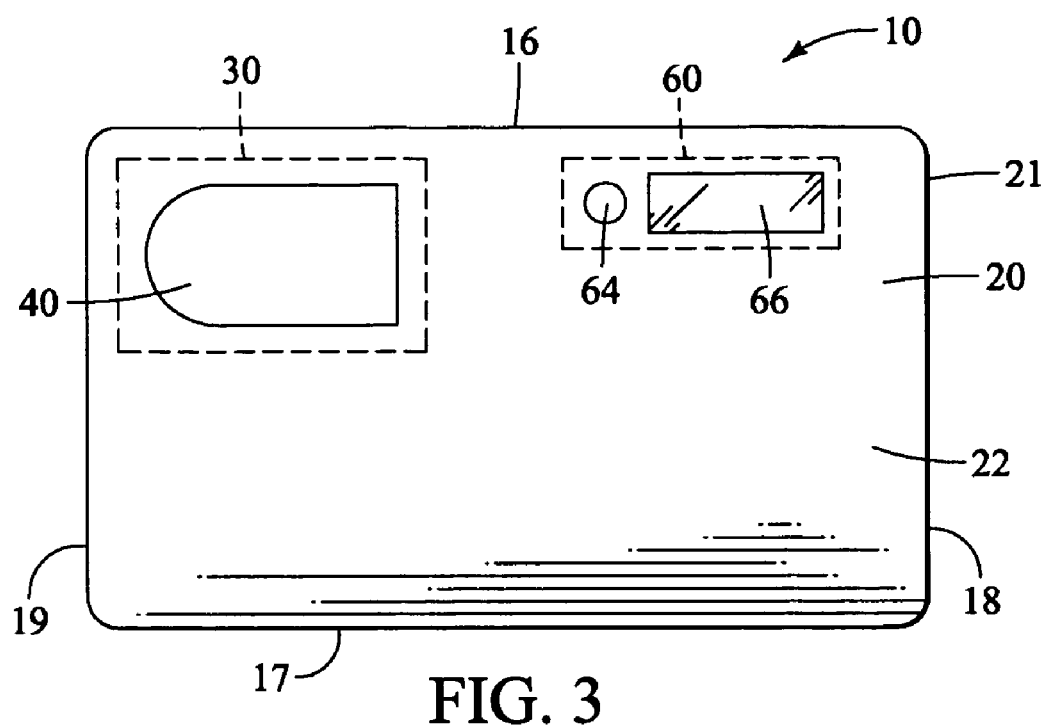
FIG. 3 is a front view of a exemplary card in accordance with one embodiment of the present invention.
Figure 4:
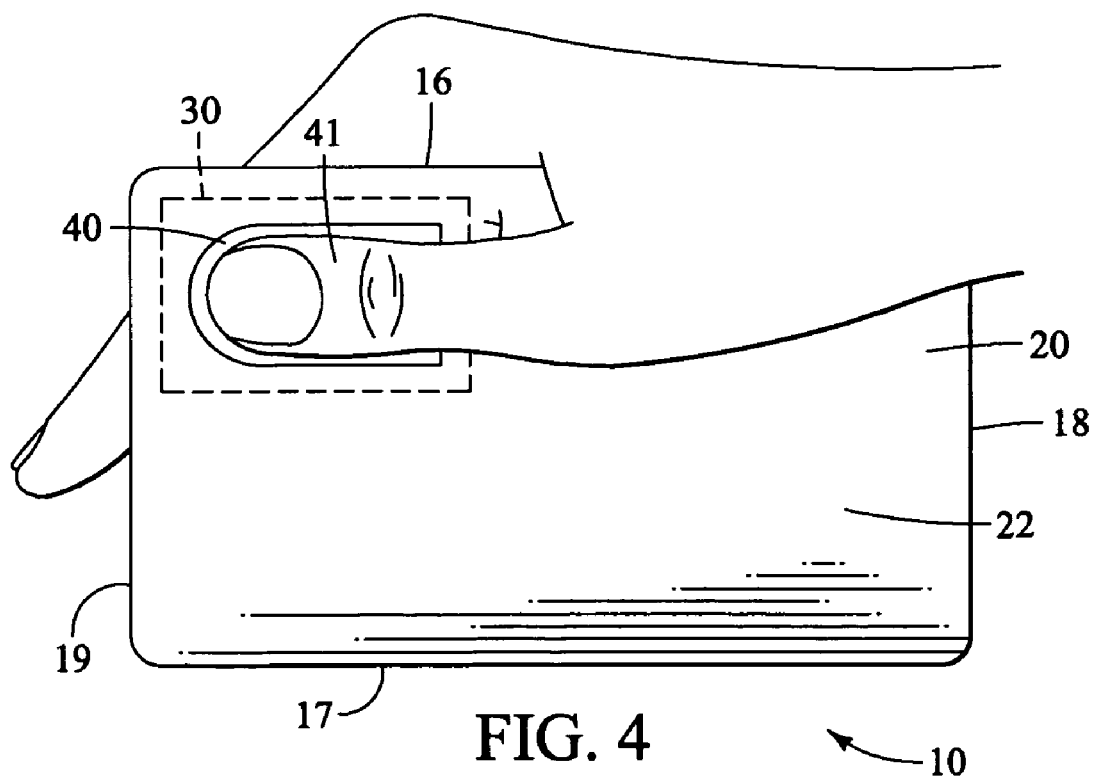
FIG. 4 shows a user grasping the card of FIG. 3 so that thumbprint information can be obtained.

Referring to FIGS. 3 and 4, in another preferred implementation, the input device or other detector 30 can comprise a biometric sensor 40 adapted to receive the authentication and any other needed data. The use of any suitable biometric sensor is contemplated by the present invention, whether now known or hereafter developed.

In FIG. 4, the biometric sensor 40, is configured to receive the user's fingerprint or thumbprint which can then be used as the authentication data. When such a biometric sensor 40 is employed, the step of entering authentication data can comprise the user placing a digit 41 (such as his or her finger or thumb) on the biometric sensor 40. Once the biometric sensor 40 has scanned or otherwise read the fingerprint, thumbprint, etc. (ire., authentication data), the fingerprint data is sent to the processor (as described below).

Memory and Processor Controller

Figure 5:
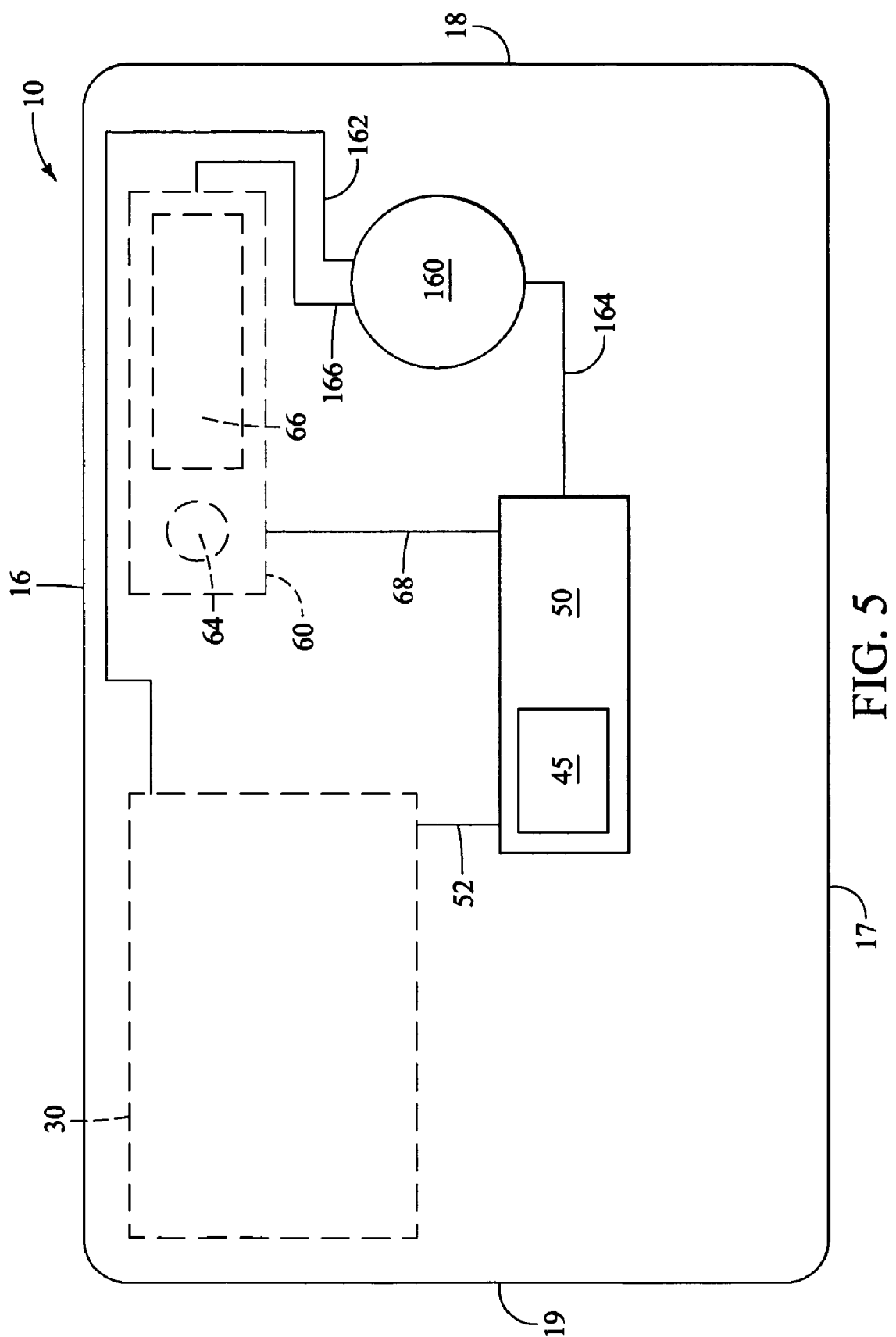
FIG. 5 is a diagrammatic view of the internal components of an exemplary card in accordance with one embodiment of the present invention.

As best shown in FIG. 5, card 10 includes a memory 45 which is configured to store reference data and facilitate processing, as needed. This reference data can be a PIN, a fingerprint, and/or any other suitable reference data or combinations or subcombinations of reference data fields thereof which will be useful in the authentication process.

Card 10 also includes a processor 50. Processor 50 is configured to perform the electronic and related processing, such as comparing the authentication data entered by the user (e.g., consumer or other card presenter) to the reference data stored in the memory 45 to determine whether the authentication data entered by the user matches the reference data. In other words, the processor 50 determines whether the authentication data entered is correct authentication data (i.e., valid authentication data which matches or otherwise meets the requirements of the reference data). The memory 45 can be incorporated within the processor 50 as shown in FIG. 5, or the memory 45 can be separate from, but in communication with, processor 50.

In operation, a user will enter authentication data (e.g., PIN, biometric and/or other data) using the user input device 30. For example, in one implementation, the user can enter a PIN using the number keys 35 on the keypad 34. After the PIN has been input, the user can press the enter key 36 to send the PIN (i.e., authentication data) to the processor 50 by processor input connection 52.

Once the authentication data (e.g., PIN) has been entered by the user and has been received by the processor 50, the processor 50 performs by comparing the authentication data (e.g., PIN) entered by the user to the reference data stored in the memory 45 to determine whether the authentication data (e.g., PIN) entered by the user matches or is otherwise accepted in relation to the reference data stored in the memory 45. In other words, the processor 50 determines whether the authentication data that was entered is valid or otherwise acceptable. In this situation the reference data stored in memory would be the user's PIN which had been earlier placed into the memory 45.

In another implementation, the user can place a digit 41 (e.g., his or her finger or thumb) on the biometric sensor 40. The fingerprint (or thumbprint) is then captured or otherwise scanned by the biometric sensor 40 and sent to the processor 50 by input-processor connection 52. Once the authentication data (e.g., fingerprint) entered by the user has been received by the processor 50, the processor 50 compares the authentication data (e.g., fingerprint) entered by the user to the reference data stored in the memory 45 to determine whether the authentication data (e.g., fingerprint) entered by the user matches the reference data stored in the memory 45. In other words, the processor 50 determines whether the authentication data entered is correct. In this situation the reference data stored in -memory 45 would be the user's fingerprint or thumbprint which had been earlier placed in the memory 45.

The methods and operation of the inventions described herein may also include multiple authentication subroutines. For example, a card 10 can include both a thumbprint detector 40 (as shown in FIGS. 3 and 4) and a plurality of numerical keys 35 (as shown in FIG. 1). This or other combinations may be used to enhance security by requiring both input of a PIN and detecting the thumbprint followed by successfully matching both the thumbprint information and PIN information. Other combinations and permutations of available fields may be desirable and implemented according to the inventions.

In one implementation, account information would be programmed on the card 10. Then, after the account information had been programmed on the card 10, the card 10 would be provided to the user who would select reference authentication data (e.g., select a PIN number) which is to be used in the verification/authentication process. It is possible for the user to select the reference authentication data (e.g., PIN) in person (e.g., at the card issuer's offices) or remotely (e.g., by telephone, the internet, or any other suitable means of communication).

In another implementation, the reference authentication data (e.g., PIN and/or biometric data) which is to be used in the verification/authentication process would be programmed on the card 10 by the card issuer.

The present invention also contemplates using various combinations, subcombinations or permutations of these approaches. For example, both the user and the card issuer can select reference authentication data which can be used in the verification/authentication process.

The Indicators Generally

Referring now to FIGS. 1, 3 and 5, the card 10 includes at least one indicator 60, shown here in phantom lines. The indicator 60 is configured to inform a verifying acceptor (e.g., a merchant who received the card as a form of payment, a financial institution, and/or any other card acceptor) when the processor 50 has determined that the card presenter (e.g., user, consumer and/or any other card presenter) has entered the correct authentication data.

The use of any suitable indicator 60 is contemplated by the present inventions. By way of example, and not by way of limitation, the indicator 60 can comprise a light emitting diode (LED) (or any other suitable light source), a liquid crystal display (LCD), and/or any other visible indicator or combination of indicators.

In one implementation, the indicator 60 comprises an indicator light 64 configured to turn on temporarily in response to user entry of valid authentication data. In other implementations, the indicator 60 can comprise a display 66 which can show one or more numbers, letters and/or other symbols. In some implementations, the indicator 60 may include only one indicator light 64 or the display 66, while in other implementations the card 10 can include both an indicator light 64 and a display 66. Such indicators 60 are described in further detail below.

As shown in FIG. 5, the indicator 60 (e.g., indicator light 64 and/or display 66) is electrically coupled to the processor by processor-indicator connection 68. When the processor 50 determines that the user has entered valid (i.e., correct) authentication data, the processor 50 can send a signal to activate the indicator 60 as appropriate.

It should be noted that different types of indicators 60 can be better suited for different types of transactions. For example, when the card 10 is presented to a verifying acceptor (e.g., merchant or merchant reading apparatus) in person, the verifying acceptor can be responsible for visually examining the card 10 and checking the indicator 60 (e.g., checking to see if an indicator light 64 is illuminated) to be informed whether the authentication data entered by the user (e.g., consumer) authorizes the use of the portable identification card 10. In other cases, when the user (e.g., consumer) attempts to provided card information indirectly to the verifying acceptor (e.g., merchant), such as when making a telephone or internet purchase, the verifying acceptor may be unable to visually examine the card 10 to check the indicator 60. In situations such as these, other types of indicators 60 which display a security code can be used more effectively as described below.

The Indicator Light Embodiment

In one preferred embodiment, the card 10 can include a visible indicator 60 in the form of a simple indicator light 64 (such as an LED). This indicator 60 (i.e., the indicator light 64) can be configured to be temporarily illuminated when the processor 50 has determined that the authentication data (e.g., PIN and/or biometric data) entered by the user matches or is otherwise accepted in relation to the reference data stored in the memory 45.

The indicator 60 is thus configured to inform the verifying acceptor (e.g., merchant) when the processor 50 has determined that the user (e.g., consumer) has entered the correct authentication data. When presented with such a card 10, it can be the responsibility of the verifying acceptor (e.g., merchant, merchant representative or merchant reader) to check the indicator 64 or multiple indicators to verify that the person presenting the card 10 has entered valid (i.e., correct) authentication data.

The simple task of checking the indicator light 64 to see if it is illuminated is easy and unobtrusive to the user. When using such an indicator 60 for verification, it is not necessary for the verifying acceptor to perform additional verification procedures. For example, when such a card 10 is presented to a merchant, it is generally not necessary for the merchant to request identification (e.g., a drivers license) from the user, and to then compare the signature on the card 10 to the signature on the user's drivers license. Nor is it necessary for the merchant to examine the user's drivers license photograph, and to then attempt to match the photograph to the user who presented the card 10. Although the use of the described indicator 60 (i.e., indicator light 64) generally makes additional verification unnecessary, the use of such an indicator 60 does not preclude the use of additional verification methods and apparatuses.

The indicator light 64 can be configured to stay on for a predetermined period of time once the correct authentication data has been entered, and to then cycle off automatically. The duration of illumination should be long enough to allow the verifying acceptor to receive the card 10 and check the indicator 60 to determine whether or not the indicator light 64 is illuminated. However, the duration of illumination should be a short enough to help prevent the card 10 from being fraudulently used by others while the indicator light 64 is illuminated. By way of example, the indicator light 64 can be configured to turn on for ten seconds in response to the entry of valid authentication data and to then turn off automatically. However, any other suitable time period can be used.

Figure 7:
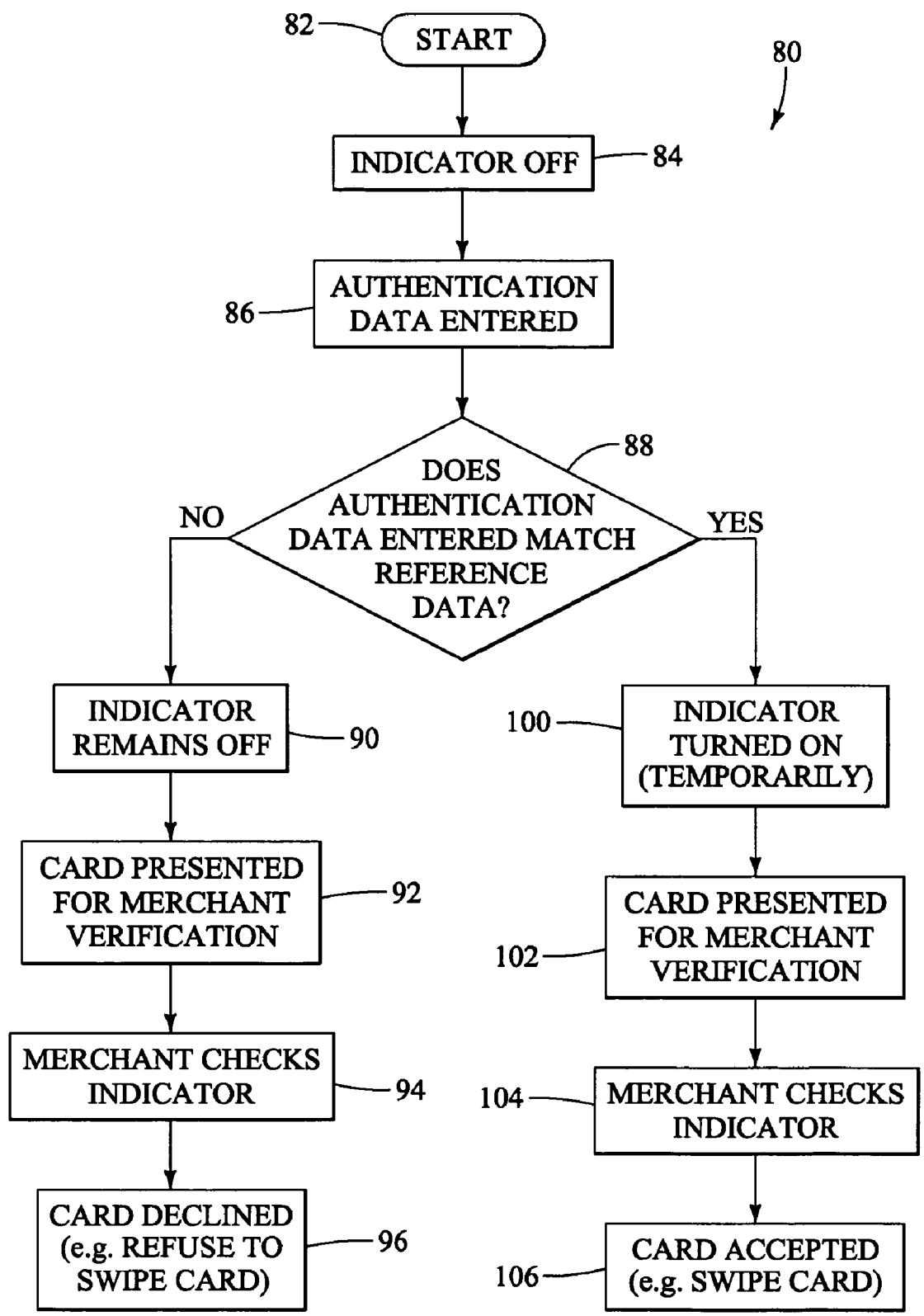
FIG. 7 is a flow chart illustrating certain aspects of the present invention in accordance with one process of the present invention.

Referring now primarily to FIG. 7, one example of such an indicator 60 is now described with reference to an exemplary flowchart 80. In this example, the indicator 60 is present in the form of a simple indicator light 64.

As shown in FIG. 7, the flowchart 80 starts with numeral 82. Next at step 84, the indicator 60 or indicator light 64 is shown to be off—which is the default state for the indicator light 64. If the card 10 is presented to a merchant for verification while in the indicator 64 is off, the merchant should refuse to accept the card 10 since valid authentication data which authorizes use of the card 10 has not been entered.

At step 86, authentication data is entered using the input device 30 (e.g., keypad 34, biometric sensor 40, and/or other suitable input device(s)). The authentication data entered may be correct or valid (i.e., the authentication data entered matches or relates by some transform function to the reference data stored in the memory 45), or it may be incorrect (i.e., the authentication data entered does not match or relate to the reference data stored in memory 45).

At step 88, the processor 50 compares the authentication data entered or otherwise detected using the input device 30 with the reference data stored in the memory 45, and determines whether the data entered matches or relates to the reference data.

If at step 88, the processor 50 determines that the authentication data entered does not match the reference data stored in the memory 45, the indicator 64 will remain off as shown by step 90.

At step 92, the card 10 is presented to a merchant for verification. In this example, the card 10 is presented to the merchant in person so that the merchant can visually examine the card 10.

At step 94, the merchant checks the indicator 64 to see if it is illuminated indicating that the user entered valid authentication data and is authorized to use the card 10, or if the indicator 64 remains off.

At step 96, the card 10 is declined by the merchant because the indicator 64 is still off, indicating that valid authentication data has not been entered. In other words, the merchant should selectively refuse or accept the card 10 as a method of payment depending on the indicator. In the case of a card 10 having a magnetic stripe 23, the merchant should refuse to swipe the card 10 through a magnetic swipe card reader 24 since valid authentication data has not been entered by the user.

Returning once again to step 88. If at step 88, the processor 50 determines that the authentication data entered matches the reference data stored in the memory 45, the indicator 60 will be turned on, as shown by step 100. As described previously, the indicator 60 is preferably turned on temporarily in response to the entry of valid authentication data.

At step 102, the card 10 is presented to a merchant for verification. In this example, the card 10 is presented to the merchant in person so that the merchant can visually examine the card 10.

At step 104, the merchant checks the indicator 64 to see if it is illuminated indicating that the user entered valid authentication data and is authorized to use the card 10, or if the indicator 64 remains off.

At step 106, the card 10 is accepted by the merchant as a method of payment since the indicator 60 has been temporarily turned on—indicating that the user entered valid authentication data. In the case of a card 10 having a magnetic stripe 23, the merchant should swipe the card 10 through a magnetic swipe card reader 24 since valid authentication data has been entered by the user. Alternatively, other types of card readers may be used.

In the steps described above, it is the responsibility of the merchant or other verifying acceptor to visually inspect the indicator 60 on the card 10 to determine whether or not the user is authorized to use the card 10. When a merchant notices that a user is unable to enter valid authentication data, the merchant can notify the bank or other card issuer to be alert for possible card fraud and/or may confiscate the card 10 as appropriate.

A Display Embodiment

In a second preferred embodiment, the card 10 includes an indicator 60 in the form of a display 66 which can show one or more numbers, letters and/or other symbols. This display 66 (i.e., indicator 60) can be configured to temporarily display selected symbols when the processor 50 has determined that the authentication data (e.g., PIN and/or biometric data) entered by the user matches or is otherwise accepted in relation to the reference data stored in the memory 45. For example, the display 66 can be configured to temporarily show or display a secret security code when the processor 50 determines that valid authentication data has been entered by the user.

This implementation of card 10 can provide additional safeguards against various types of card fraud. For example, as discussed previously, many prior cards include a security code which is printed, embossed or otherwise provided on the surface of the card. Such a security code is readily visible to anyone in possession of the prior card. Many telephone and internet merchants require that the customer provide this security code when placing an order. Although this requirement helps to insure that the person attempting to use the card is in possession of the card, this procedure does little to prevent an unauthorized user in possession of the card from theft or by surreptitious data theft and then making unauthorized purchases. Such unauthorized users have easy access to visible security code printed on a card and can therefore provide the security code in order to make fraudulent purchases with a stolen card or equivalent stolen card data.

In contrast, in one implementation, card 10 of the present invention does not include a security code which is readily visible to anyone in possession of the card 10. Instead, the card 10 includes a display 66 which will temporarily display the security code in response to user entry of valid authentication data. Therefore, if such a card 10 is stolen, the security code is unavailable to the thief, who may be deterred from making many unauthorized telephone and/or internet orders.

It should be noted, that it is also possible to use the display 66 showing the security code in the same way that the simple indicator light 64 is used. That is, after the user has entered the authentication data, the merchant can simply check the display 66 (rather than check an indicator light 64) to determine if the user entered valid authentication data. If the user entered valid authentication data, the security code or other suitable information will be temporarily displayed to confirm authorization.

Figure 8:
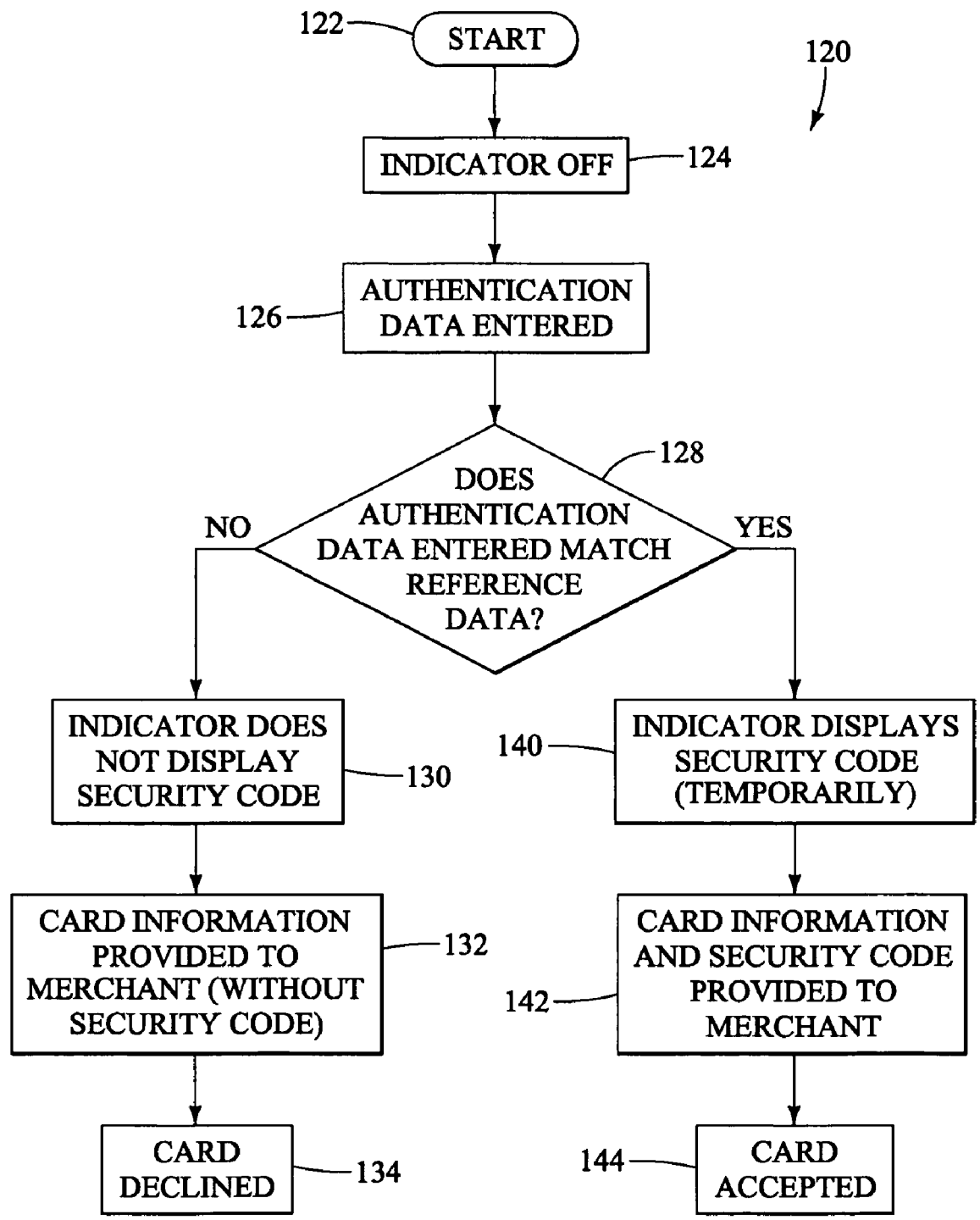
FIG. 8 is a flow chart illustrating certain aspects of the present invention in accordance with another process of the present invention.

Turning now primarily to FIG. 8, one example of such a display 66 is now described with reference to an exemplary flowchart 120. Here the indicator 60 is present in the form of a display 66. The display 66 is configured to temporarily show or display a secret code when the processor 50 determines that valid authentication data has been entered by the user.

As shown in FIG. 8, the flowchart 120 starts with numeral 122. Next at step 124, the indicator 60 (i.e., display 66) is shown to be off—which is the default state for the indicator 60 (i.e., display 66). As described above, if the card 10 is presented to a merchant in person for verification the display 66 can be used in the same way as the indicator light 64. That is, the merchant should refuse to accept the card 10 if the display 66 is off, since valid authentication data has not been entered by the user. However, in addition to this use, the display 66 of the card 10 can be useful in preventing fraud in other situations, such as when the card 10 in not presented in person for visual verification of the indicator 60.

At step 126, authentication data is entered using the input device 30. The authentication data entered may be correct or valid (i.e., the authentication data entered matches or relates to the reference data stored in the memory 45) or it may be incorrect (i.e., the authentication data entered does not match or relate to and differs from the reference data stored in the memory 45).

At step 128, the processor 50 compares the authentication data 20 entered or otherwise detected using the input device 30 with the reference data stored in the memory 45, and determines whether the data entered matches the reference data.

If at step 128, the processor 50 determines that the authentication data entered does not match the reference data stored in the memory 45, the display 64 will remain off and will not display the security code, as shown by step 130.

At step 132, information from the card 10 is presented to a merchant. The information presented will typically include information which is written or embossed on the front or back surfaces 20, 21 of the card 10. By way of example, this information can include such things as: the account number, the card holder's name, the date the card holder became a member (i.e., member since data), and the expiration date. However, because the user has not entered valid authentication data, the display 64 will not provide the security code, and the security code will not be provided to the merchant.

At step 134, the card 10 is declined by the merchant because the security code has not been provided. This failure to provide the security code informs the merchant that the person who is attempting to use the card 10 is not authorized to use the card 10 (i.e., the user has failed to enter valid authentication data).

Returning once again to step 128. If at step 128, the processor 50 determines that the authentication data entered matches the reference data stored in the memory 45, the display 66 will temporarily display the security code as shown by step 140. As described previously, the indicator 60 (here display 66) is preferably turned on temporarily in response to the entry of valid authentication data.

At step 142, information from the card 10 is presented to a merchant. The information presented will typically include information which is written or embossed on the front or back surfaces 20, 21 of the card 10 as described above. However, because the user has entered valid authentication data, the display 64 will provide the security code which will also be provided to a the merchant.

At step 144, the card 10 is accepted by the merchant because the security code has been provided along with the other card information. The provision of the security code informs the merchant that the person who is attempting to use the card 10 is authorized to use the card 10 (i.e., the user has entered valid authentication data).

Selectively Lit Static Security Code 16

In a further embodiment, the indicator and display of a secret security code may be combined into a single indicator (not illustrated). In a preferred form of such construction the secret security code may be a number, letters, or alphanumeric code of various number of characters.

An LED or other low power requirement light source can be positioned behind, laterally or otherwise suitably positioned to illuminate the code when the authentication in put is valid. In a simple form, a static code could be provided by various static code characters which cannot be perceived until the associated backlight, sidelight or other indicating illuminator lights and renders the code visible for a desired period of time. Otherwise the static code is invisible by covering with dark plastic or glass covering the static code. By shining an illuminating beam on the code, it is thereby rendered visible.

The Power Source

Referring now to FIG. 5, the card 10 also includes a power source 160. The power source 160 is adapted to supply power to the card apparatus generally, and more specially to input device 30, memory 45, processor 50, and indicator 60. The use of any suitable power source is contemplated by the present invention. For example, in the embodiment depicted in FIG. 5, the power source 160 is a battery.

As shown in FIG. 5, power is supplied to the input device 30 by the input-power connection 162. Power is supplied to the processor 50 by the processor-power connection 164. Similarly, power is supplied to indicator 60 by the indicator-power connection 166.

In alternative constructions of apparatuses according to the inventions described herein, the power supply 160 can be provided by or supplemented by a photovotaic generator, piezoelectric generator, capacitor or other storage or generation devices or combinations and subcombinations thereof, now known or hereafter developed.

Other Aspects of Securing Information

Figure 9:
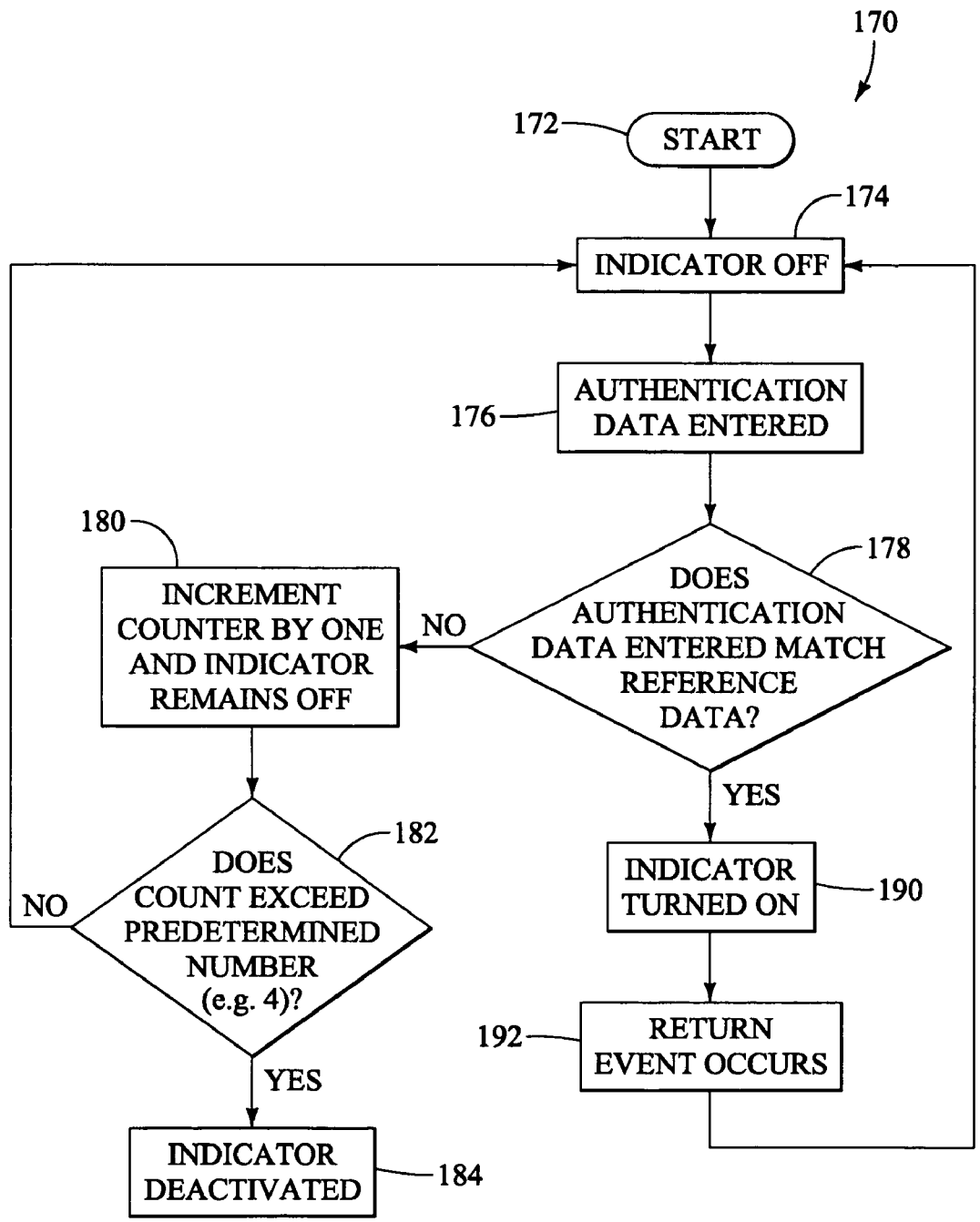
FIG. 9 is a flow chart illustrating certain aspects of the present invention in accordance with another process of the present invention.

Turning now primarily to FIG. 9, another exemplary flowchart 170 is described with respect to one aspect of preventing unauthorized use of the card 10 in accordance with one embodiment of the present invention. The numbers used in FIG. 9 to describe the flowchart are provided by way of example only, and not by way of limitation. FIG. 9 generally describes one implementation of the card 10 in which the processor 50 is configured to count sequential or total numbers of entries of invalid authentication data.

As depicted in FIG. 9, the flowchart 170 starts at numeral 172. Next at step 174, the indicator 60 (i.e., the indicator light 64 and/or display 66) is shown to be off—which is the default state for the indicator 60.

At step 176, authentication data is entered using the input device is 30. The authentication data entered may be correct or valid (i.e., the authentication data entered matches the reference data stored in the memory 45) or it may be incorrect (i.e., the authentication data entered does not match the reference data stored in the memory 45).

At step 178, the processor 50 compares the authentication data entered or otherwise detected using the input device 30 with the reference data stored in the memory 45, and determines whether the data entered matches the reference data.

If at step 178, the processor determines that the authentication data entered does not match the reference data stored in the memory 45, the indicator 60 will remain off and the processor will increment a counter by one as shown by step 180. The processor thus counts sequential or total entries of invalid authentication data or sequential or total attempts to enter invalid authentication data.

At step 182, the processor determines whether the count exceeds a predetermined number. By way of example, the number four can be selected. In this example, when the count of invalid sequential or total entries of authentication data exceeds the predetermined number (e.g., four), the indicator 60 can be automatically deactivated as shown by step 184. This deactivation can be permanent or temporary. For example, in one implementation the deactivated indicator 60 can only be reactivated with assistance from the card issuer (e.g., the bank). In such a case, when the indicator 60 is deactivated, the user may need to call the bank and provide qualifying information to assure bank personnel that the user is in fact the authorized card holder. Once the bank is satisfied that the user is in fact the authorized card holder, the bank may reactive the card 10 as appropriate.

Returning once again to step 178. If the processor 50 determines that the authentication data entered matches the reference data stored in the memory 45, the indicator 60 will be turned on as shown by step 190.

At step 192, a return event occurs. The return event can be any event which causes the indicator 60 to once again be turned off. As described previously, the indicator 60 can be configured to stay on for a predetermined period of time (indicator display period) once valid authentication data has been entered, and then to cycle off automatically. Thus, the passing of a predetermined period of time is one example of a return event.

The duration of illumination should be long enough to allow the verifying acceptor to receive the card 10 and to check the indicator 60 to determine whether or not the user has entered valid authentication data. However, the duration of illumination should be a short enough to help prevent the card 10 from being fraudulently used by others while the indicator 60 is on. By way of example, the indicator light 64 can be configured to turn on for ten seconds in response to the entry of valid authentication data and to then turn off automatically. However, any other suitable time period can be used.

Further Methods

The present inventions include several novel methods, many described above and additional description will now be provided. Some or all aspects of these may be described above or elsewhere herein. Some of these concern methods for using, processing and/or manufacturing portable identification cards 10.

For example, in one implementation a method for manufacturing a portable identification card 10 is described. The method includes providing a card body 22, and also providing an input device 30 integrated with the card body 22. The input device 30 is adapted for a consumer to enter authentication data. The method also includes the step of providing a memory 45 which is integrated with or otherwise mounted on the card body 22. The memory 45 is adapted for storing reference data. The method also includes the step of providing a processor 50 which is integrated with the card body 22.

The processor 50 is configured to compare or otherwise use the authentication data entered by the consumer relating it to the reference data stored in the memory 45. The action provides a determining step as to whether the authentication data entered by the consumer is correct authentication data. The method further includes the step of providing at least one indicator 60 which is integrated with the card body 22. The indicator 60 is configured to inform a merchant when the processor 50 has determined that the consumer has entered the correct authentication data. Still further, the method includes the step of providing a power source 160 integrated with the card body 22. The power source 160 is adapted to supply power to the processor 50, indicator 60 and other parts of the card as needed or desired. The method can also include the step of providing a magnetic stripe 23 on the card body 22, although the provision of the magnetic stripe 23 is not required. When provided, the magnetic stripe 23 can be configured to store information which can be read using a conventional magnetic swipe card reader 24.

In yet another version of the invention the finger detector 40 is used as an activator which initiates operation of the card. The remaining time extremely small amounts or no power is required. The finger detector may be used by activating the card electronics for a suitable detection period, such as 1-20 seconds, more preferably 5-15 seconds, even more preferably approximately 10 seconds. The customer holding the unit properly causes activation and automatically turns the card on so the fingerprint analysis or other authentication parameter or parameters may be used selectively or in combination.

In the case of the finger or other detector 40, if there is no match between the programmed finger and the finger being used as authenticating information, then the card is rendered inoperable because it is involved in an attempt to use the card by a person not authorized or able to use the card properly.

In a further alternative approach the card is kept continuously powered at an extremely low current draw to facilitate the rapid activation of the card when held in a proper activating position, such as shown in FIG. 4. When an incorrect identification code is input, then the indicators are inactivated.

Manner of Making

The cards may be produced using technology for mounting microprocessors, batteries and other small electronic components which are described above, into a plastic card or other suitable mounting piece. In some cases the mounting piece may be smaller than a typical card and then an envelope of added layers may be heat welded or adhered thereto.

The electrical components are commercially available. The electrical components may be molded into the plastic card or mounted into or onto a plastic card which has been cut to allow positioning of the components described herein.

Programming is preferably provided in the controller and may effect various events, some of which have been described elsewhere herein. The controller is thus programmed in a manner which provides the various operational states or the constructions which are described, implied or which are given herein.

Interpretation Note

The invention has been described in language directed to the current embodiments shown and described with regard to various structural and methodological features. The scope of protection as defined by the claims is not intended to be necessarily limited to the specific features shown and described. Other forms and equivalents for implementing the inventions can be made without departing from the scope of concepts properly protected hereby.

I claim:

1. An apparatus forming a portable identification card which can be read using a magnetic card reader, comprising:
    a magnetic stripe on the portable identification card for storing information readable by the card reader;
    at least one input device on the portable identification card allowing a consumer to enter authentication data;
    a memory for storing reference data mounted to the portable identification card;
    a processor mounted to the portable identification card and configured to validate or invalidate the authentication data entered by the consumer relative to the reference data stored in the memory to determine whether the authentication data entered by the consumer is valid or invalid authentication data;
    an indicator configured to inform a merchant when the processor has determined that the consumer has entered valid authentication data;
    at least one changeable symbol display for displaying a plurality of changeable symbols selected from a plurality of numeric, alphabetic or other symbols;
    a power source adapted to supply power to the processor and the indicator.

2. The apparatus according to claim 1 wherein the indicator is a visual indicator.

3. The apparatus according to claim 1 wherein the at least one input device comprises at least one key adapted to provide authentication data entered by the consumer.

4. The apparatus according to claim 1 wherein the at least one input device comprises a biometric sensor adapted to receive the authentication data entered by the consumer.

5. An apparatus forming a portable identification card, comprising:
    at least one input device on said portable identification card for a user to enter authentication data;
    a memory on said portable identification card for storing data including reference data;
    a processor on said portable identification card configured to perform a validation analysis of the authentication data entered by the user relative to the reference data stored in the memory to determine whether the authentication data entered by the user is valid or invalid authentication data;
    at least one indicator on said portable identification card configured to inform a merchant when the processor has determined that the user has entered valid authentication data;
    at least one changeable symbol display for displaying a plurality of changeable symbols selected from a plurality of numeric, alphabetic or other symbols;
    a power source adapted to supply power for the apparatus.

6. The apparatus according to claim 5 wherein the indicator is a visual indicator.

7. The apparatus according to claim 5 wherein the at least one input device comprises at least one key adapted to receive the authentication data entered by the user.

8. The apparatus according to claim 5 wherein the at least one input device comprises a biometric sensor adapted to receive the authentication data entered by the user.

9. A method for using a portable identification card, the method comprising:
    entering authentication data using an input integrated with the portable identification card and receive entry of authentication data by a consumer;
    comparing the authentication data entered by the consumer to reference data stored in a memory integrated with the portable identification card to determine whether the authentication data entered by the consumer is correct authentication data; and displaying whether the authentication data entered by the consumer authorizes use of the portable identification card by displaying a security code on at least one changeable symbol display for displaying a plurality of changeable symbols selected from a plurality of numeric, alphabetic or other symbols;

for displaying a changeable code using said at least one symbol to serve in authentication of the user.

10. The method according to claim 9 and further comprising after said displaying step:

presenting the portable identification card to a merchant for use as a method of payment when desiring to make a purchase;

receiving by the merchant the portable identification card from the consumer who desires to make the purchase; and checking the security code to be informed whether the authentication data entered by the consumer is the correct authentication data;

comparing the displayed security code against a comparison source for the security code.

11. A method according to claim 9 wherein the comparing step is done using a comparison source not on the portable identification card.

12. A method according to claim 9 and wherein the comparison source for the security code is upon the portable identification card.

13. A method for manufacturing a portable identification card, comprising:

providing a card body;

providing an input device integrated with the card body, wherein the input device is adapted for a consumer to enter authentication data;

providing a memory integrated with the card body, wherein the memory is adapted for storing reference data;

providing a processor integrated with the card body, wherein the processor is configured to compare the authentication data entered by the consumer to the reference data stored in the memory to determine whether the authentication data entered by the consumer is correct authentication data;

providing an indicator integrated with the card body, wherein the indicator is configured to inform a merchant when the processor has determined that the consumer has entered the correct authentication data;

providing a symbol display having at least one changeable symbol display for displaying at least one symbol selected from a plurality of numeric, alphabetic or other symbols for displaying a code using said at least one symbol to serve in authentication of the user;

providing a power source integrated with the card body, wherein the power source is adapted to supply power to the identification card.

14. The method according to claim 13 and further comprising:

providing a magnetic stripe on the card body configured to store information and which can be read using a magnetic swipe card reader.

* * * * *